(12) United States Patent
Kilb et al.

(10) Patent No.: US 6,312,848 B1
(45) Date of Patent: Nov. 6, 2001

(54) ELECTRICAL RECHARGEABLE BATTERY IN THE FORM OF A BUTTON CELL

(75) Inventors: Manfred Kilb, Rainau-Schwabsberg; Dejan Ilic; Eduard Pytlik, both of Ellwangen; Siegfried Weitbrecht, Aalen, all of (DE)

(73) Assignee: Varta Geratebatterie GmbH (DE)

(*) Notice: Subject to any disclaimer, the term of this patent is extended or adjusted under 35 U.S.C. 154(b) by 0 days.

(21) Appl. No.: 09/459,806

(22) Filed: Dec. 13, 1999

(30) Foreign Application Priority Data

Dec. 14, 1998 (DE) .............................. 198 57 638

(51) Int. Cl.[7] .................. H01M 6/12; H01M 6/00
(52) U.S. Cl. .................. 429/162; 429/163; 429/164; 429/165; 429/127; 429/133; 429/34; 429/27; 429/40; 429/57; 429/58; 429/59; 29/623.1; 29/623.2
(58) Field of Search .................. 429/40, 27, 59, 429/133, 127, 162, 163, 164, 165, 57, 58, 34; 29/623.1, 623.2

(56) References Cited

U.S. PATENT DOCUMENTS 4,246,326 * 1/1981 Sprengel et al. .................. 429/59
6,127,061 * 10/2000 Shun et al. .................. 429/40

FOREIGN PATENT DOCUMENTS

| B 1 194 471 | 1/1958 | (DE) . |
| C 30 22 907 | 6/1980 | (DE) . |
| PS 1 512 211 | 3/1975 | (GB) . |

* cited by examiner

Primary Examiner—Gabrielle Brouillette
Assistant Examiner—Angela J. Martin
(74) Attorney, Agent, or Firm—Schnader Harrison Segal & Lewis LLP

(57) ABSTRACT

An electrical accumulator having a case in the form of a button cell which is closed such that it is gastight, including a case cover and a case cup with an interposed electrically insulating seal, which contain an electrode set including positive and negative electrodes as well as interposed separators, with at least two electrodes of one polarity being mechanically. and electrically connected at at least two points on their circumference in such a manner that a mechanically robust electrode packet results. The invention furthermore relates to a method for producing such a rechargeable battery.

11 Claims, 6 Drawing Sheets

Section B-B

Section C-C

Section A-A though it is gastight. The invention also relates to a method
ELECTRICAL RECHARGEABLE BATTERY IN THE FORM OF A BUTTON CELL

FIELD OF THE INVENTION

This invention relates to an electrical rechargeable battery having a case in the form of a button cell which is closed such that it is gastight. The invention also relates to a method for producing the rechargeable battery.

BACKGROUND OF THE INVENTION

Button cells generally have a flat-cylindrical or oval gastight case in which, if required, a plurality of positive and a plurality of negative electrodes with interposed separators as well as an electrolyte are arranged one above the other. The button cell itself comprises a case cup and a case cover, between which an electrically insulating plastic seal is arranged. Normally, the case cup polarity is positive and the case cover polarity is negative. The electrodes in many conventional button cells are so-called "mass electrodes" in the form of compressed powder tablets, which are held in a fine-mesh pure nickel wire mesh. It is also known for nickel-foam pure electrodes in the form of paste to be used as the basic material, from which the button cell electrodes are stamped.

Irrespective of the type of electrode used, the electrical load capacity of such conventional button cells on continuous discharge is limited to a value of about 1 CA, where 1 CA means the discharge current level which allows the cell capacity to be discharged within one hour. These button cells are thus suitable for specific applications with a relatively low current requirement. They, therefore, do not replace conventional round cells, which allow very much greater discharge currents. Button cells which contain a plurality of electrodes of one polarity are known in widely differing versions. For example, DE-C 3022907 discloses an electrode arrangement which contains an electrode set comprising three electrodes, in which the two outermost electrodes are connected to one another by an output, and the center electrode is provided with a contact pin which passes through one outer electrode and via which it is electrically connected to the case cover.

GB-PS 1 512 211 discloses an arrangement in which the electrodes, which are electrically connected at one point on their edge, are placed one inside the other with the interposition of a separator folded in a zigzag shape.

DE-B 1194471 discloses a rechargeable battery which is closed such that it is gastight and contains two sets of electrode plates in layers on top of one another, between which thin separators are arranged. In this case, the electrode plates in each set form a cohesive strip, which is folded such that the folded plates of the other plate set are located between the plates of the first set, with the separators being interposed. The series-connected plates in each set are provided with tongue-like connecting tabs which are cut out of the metal foil of the base.

With the known embodiments of button cells having a plurality of electrode plates of one polarity, increased effort is needed in production to hold the stack in the correct position during the various production phases, and to fit it into the cell case in the correct sequence.

OBJECTS OF THE INVENTION

It is accordingly one object of the invention to produce an electrical rechargeable battery in the form of a button cell, which has increased electrical power and to this extent can be compared with comparable round cells and prismatic cells, but which furthermore can be produced economically in a manner which is suitable for automation.

Other objects of the invention will be apparent to those of ordinary skill in the art based on the following drawings, detailed description of the invention and the appended claims.

BRIEF DESCRIPTION OF THE DRAWINGS

The subject matter of the invention will be explained in more detail in the following text with reference to FIGS. 1 to 8.

DETAILED DESCRIPTION OF THE INVENTION

Figure 1:
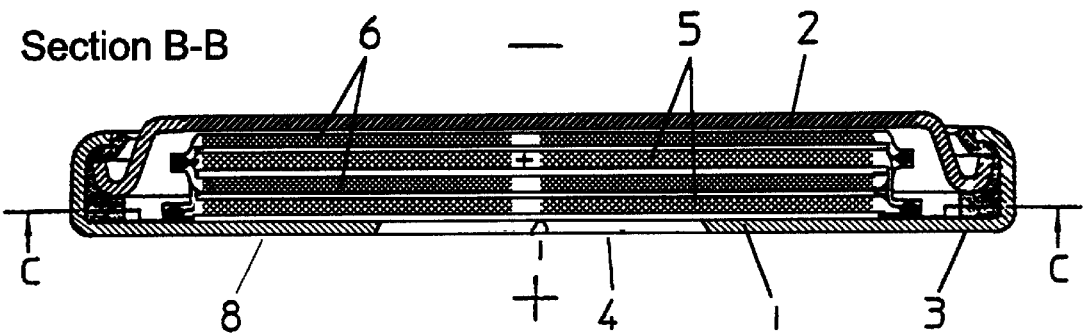
FIG. 1 shows a cross section taken through a button cell according to the invention, along the line B—B in FIG. 2.

The following description is intended to refer to specific embodiments of the invention illustrated in the drawings and is not intended to define or limit the invention, other than in the appended claims. Also, the drawings are not to scale and various dimensions and proportions are contemplated.

The button cell according to the invention comprises, as shown in FIG. 1, a case cup 1 and a case cover 2, between which an electrically insulating seal 3 is arranged, and which are connected to one another by means of a clinching process such that they are gastight. The case cup 1 also has a notch 4, which acts as a weak point, in the form of a plus sign. In addition to the normal electrolyte, the interior of the case also contains an electrode set, which comprises at least three electrodes. In the embodiment shown in FIG. 1, two positive electrodes 5 and two negative electrodes 6 are provided, which are isolated from one another by separators 7. A contact plate 8 is also provided.

Figure 4:
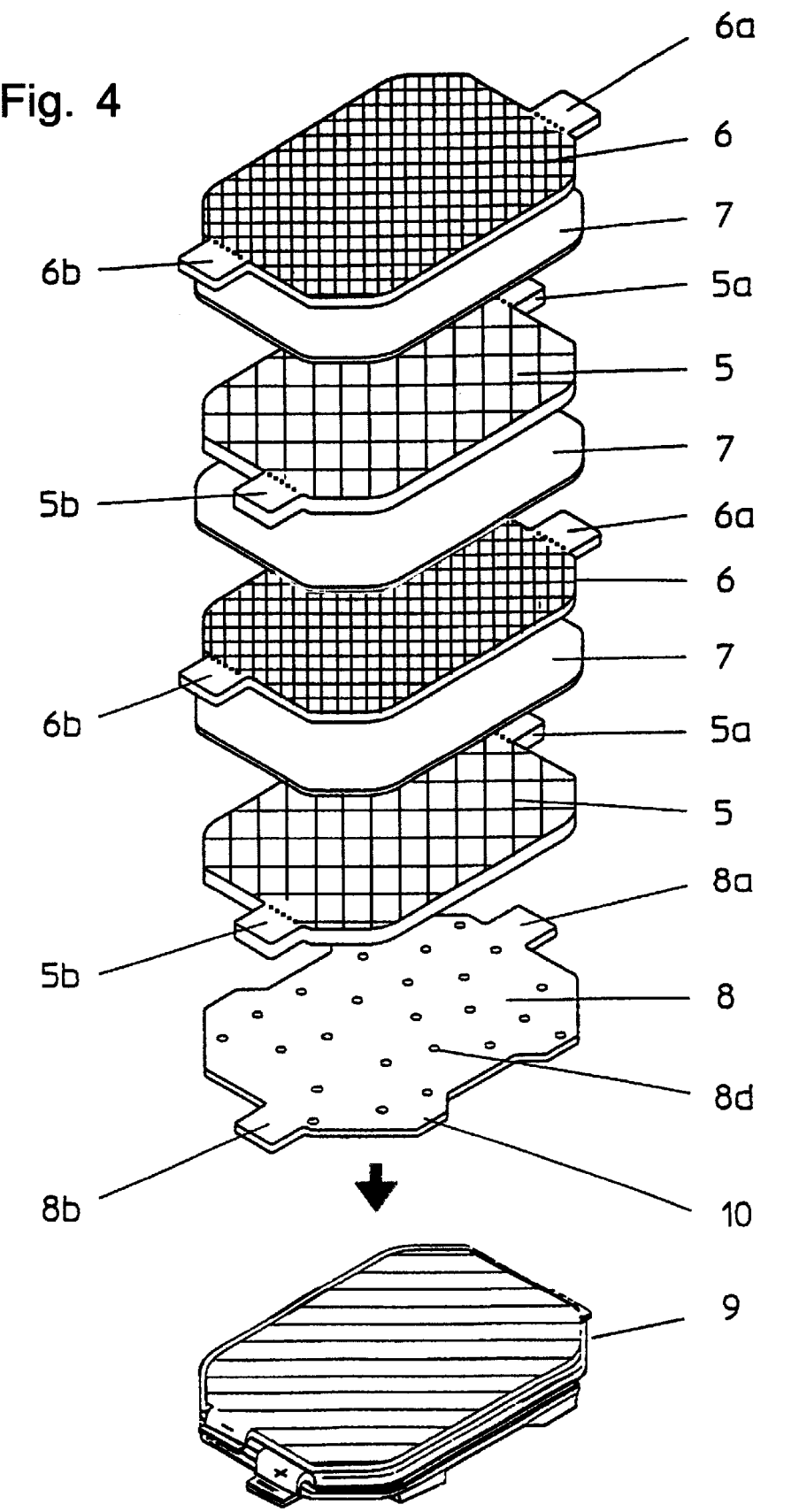
FIG. 4 shows a perspective view of the basic construction of the electrode set in this cell, broken into individual pieces for case of understanding.

This construction according to the invention can be seen in more detail in FIG. 4. Both the positive electrodes 5 and the negative electrodes 6 each have at least two output tongues 5a, 5b, 6a and 6b, which are arranged diagonally offset on the circumference of the electrode, for example, on the opposite sides. After stacking the electrodes 5, 6, separators 7 and the contact plate 8, the tongues 6a and 6b of the negative electrodes are connected to one another by a crimping or welding process. The tabs 5a and 5b of the positive electrode are connected to one another in the same way, with a corresponding connection to the lugs 8a and 8b of the contact plate 8 being produced at the same time as well. The electrode packet, which is denoted by the number 9 in FIG. 4, can easily be transported and handed as a complete electrode set once these connections have been made, and can be fitted into the button cell case without any particular difficulties. In addition, the contact plate 8 has projections 10 distributed on its circumference.

Electrode packet 9, which can also easily be transported and handled in robots, is fitted in the case cover 2, which is provided with the seal 3. The case cup 1 is then fitted to the resulting assembly. According to the invention, the seal 3 has molded-on studs 3.1 as shown in FIGS. 2 and 6 via which the electrode packet 9 and/or the projections 10 of the contact plate 8 are pressed against the case cup 1 during the clinching process.

Figure 5:
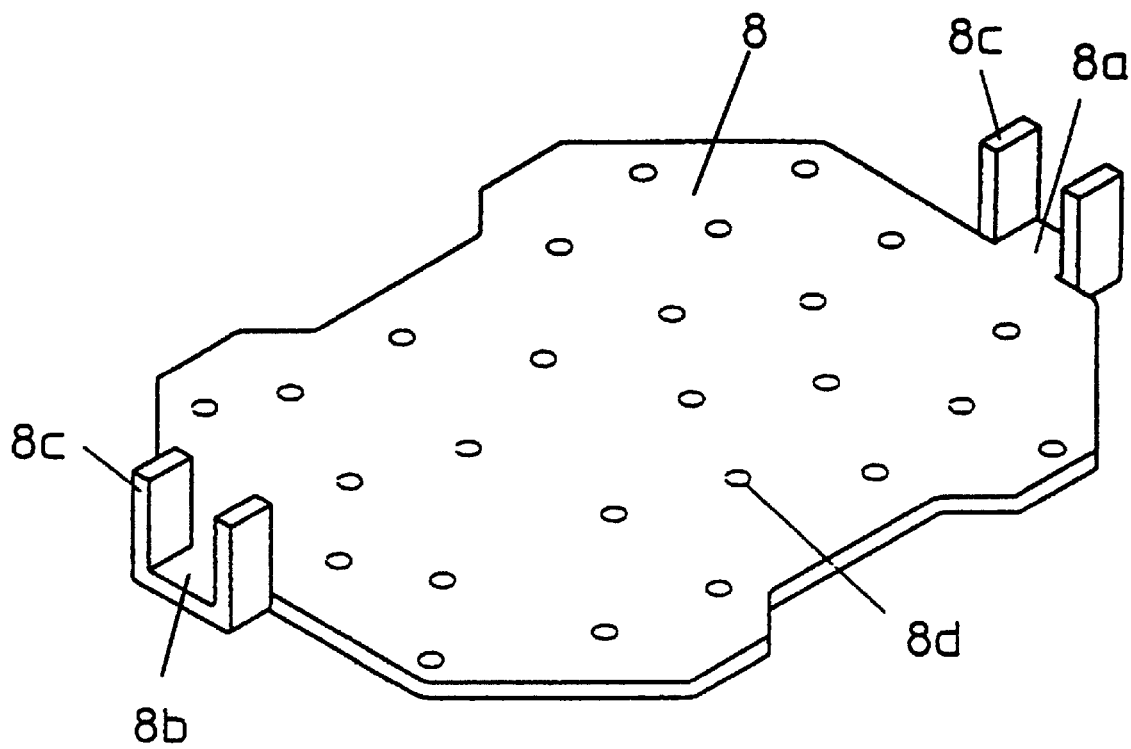
FIG. 5 shows a perspective view of one possible configuration of a contact plate which is used in accordance with aspects of the invention.

The output tongues 5a, 5b, 6a and 6b can be connected using widely differing known methods. It is particularly advantageous to utilize ultrasound welding or spot welding. If required, a contact plate 8 as illustrated schematically in FIG. 5 may also be used, which has. contact tabs 8a and 8b which are provided with additional lugs 8c. The tabs 5a and 5b of the positive electrodes 5 then engage these lugs, and the tabs 5a and 5b and lugs 8c can be electrically and mechanically firmly connected to one another by means of a crimping process. The contact plate 8 has openings 8d to ensure that the electrolyte passes through correctly to the electrode packet.

It is also advantageous for the leaf portions of separator 7 to be at least partially welded to one another at their edges which overhang the electrodes 5, 6.

Figure 2:
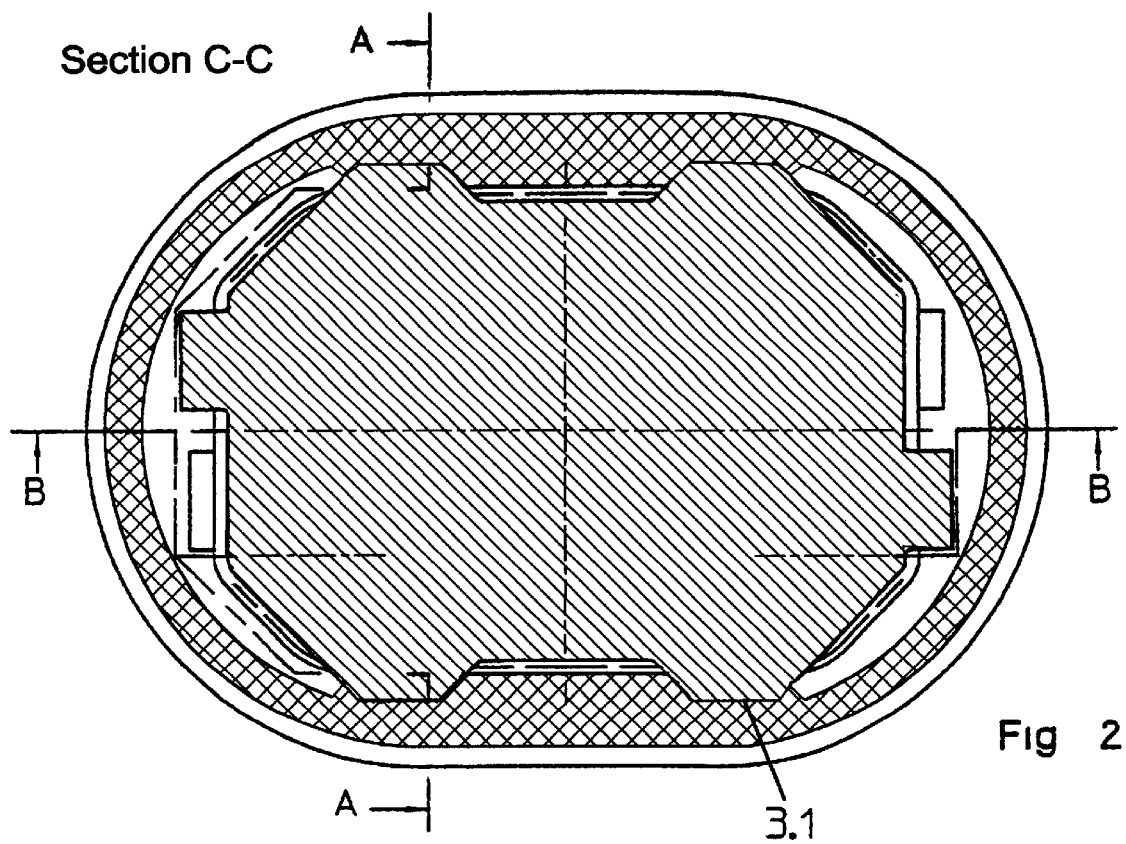
FIG. 2 is a top plane view of one embodiment of a button cell in accordance with aspects of the invention.
Figure 3:
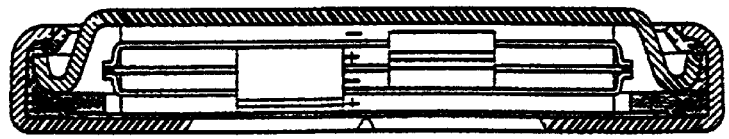
FIG. 3 shows a section along the line A—A in FIG. 2.
Figure 6:
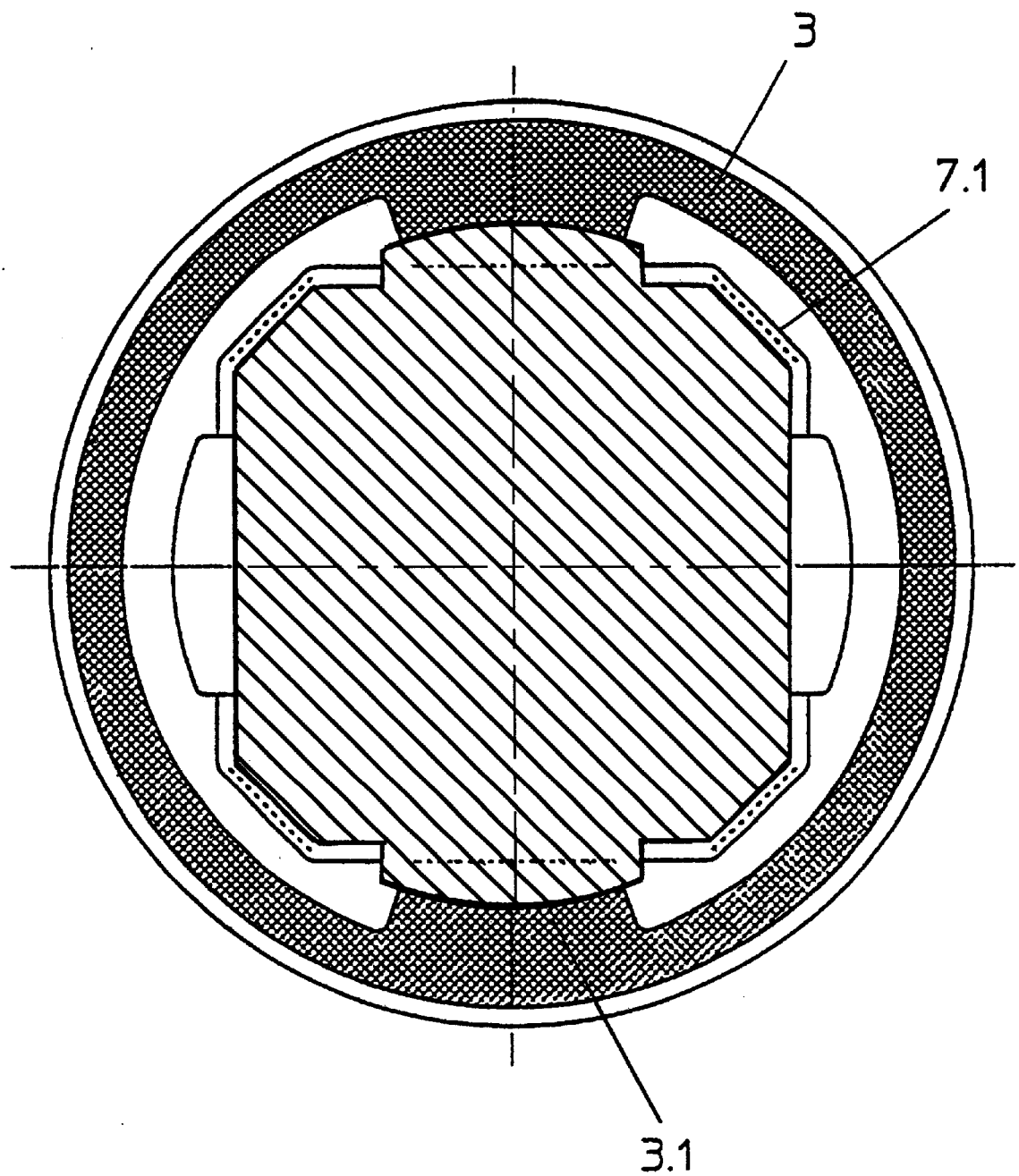
FIG. 6 shows a top plane view of a cylindrical button cell in accordance with aspects of the invention.

Instead of the oval form shown in FIGS. 1 to 3, a cell according to the invention may also be constructed as a cylindrical cell, as can be seen in FIG. 6. The substantially square positive electrode plates 5 are connected to one another on opposite sides, and the negative electrode plates 6 are connected to one another in the same way. The seal 3 has at least two studs 3.1 for additionally pressing the contact plate 8 against the bottom of the cell cup 1. The leaf portions of separator 7 are welded to one another at the four corners 7.1 of the electrode packet 9.

Figure 7:
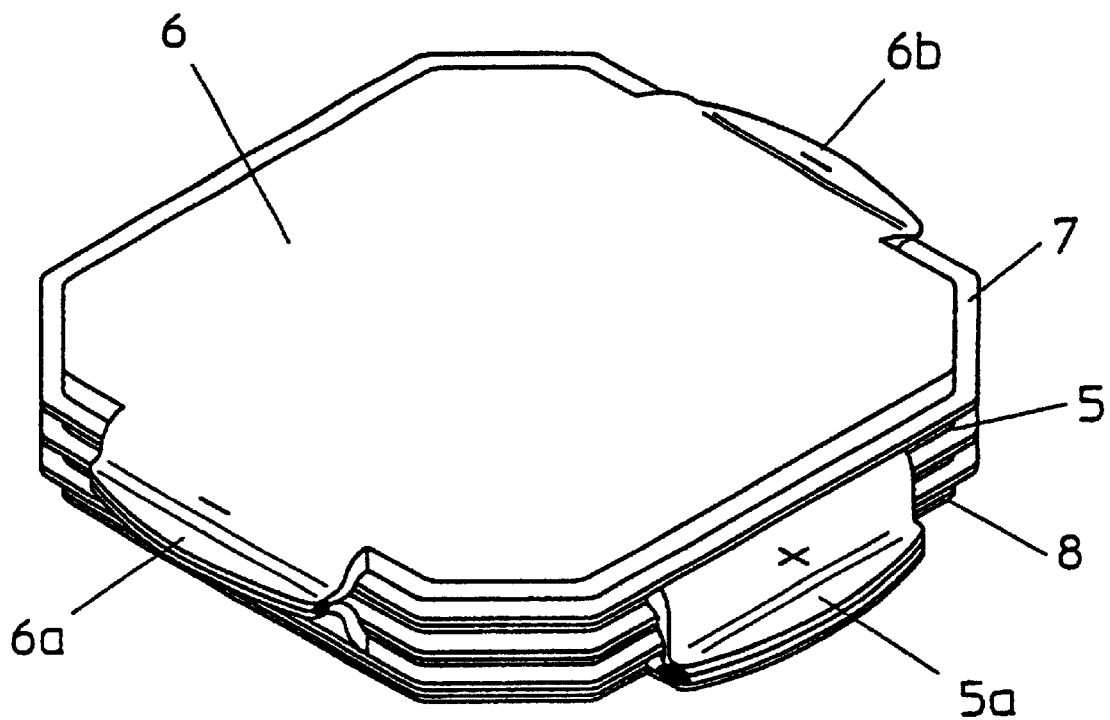
FIGS. 7 and 8 show perspective views of electrode packets in accordance with aspects of the invention.
Figure 8:
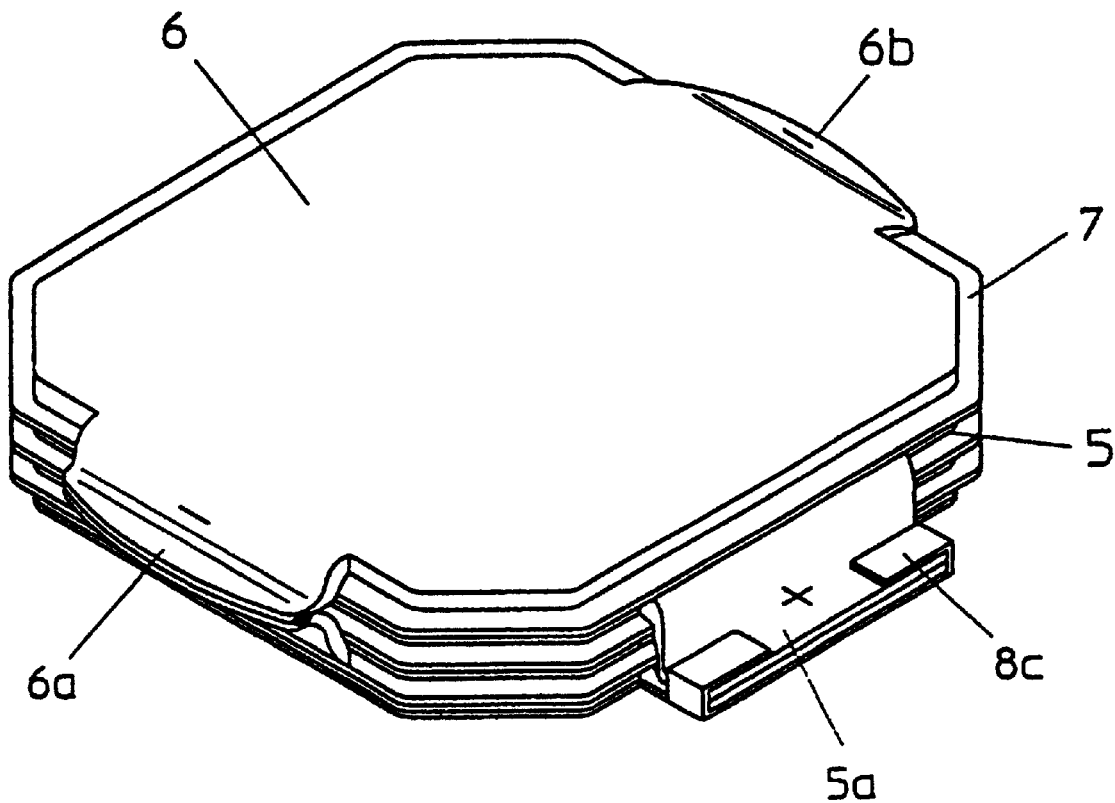

FIG. 7 shows the electrode set 9 which is suitable for a cylindrical button cell, in more detail. According to FIG. 7, the negative electrodes 6 and the positive electrodes 5 are each provided with output tongues 5a, 5b, 6a and 6b, which are located on opposite sides and welded to one another, with the positive electrodes 5 also welded to the contact plate 8, which is located at the bottom, as well. According to FIG. 8, the negative electrodes 6 are welded to one another using a known welding or ultrasound welding method, while the connecting tabs 5a, 5b of the positive electrodes 5 and the contact plate 8 connect to one another by crimping by means of the lugs 8c.

According to the invention, at least the electrode plates of one polarity or both the positive and the negative electrode plates are mechanically and electrically connected at at least two locations on their circumference, in such a manner that a mechanically robust electrode packet results.

The electrode set preferably comprises n electrodes of one polarity, and n+1 electrodes of another polarity. The electrodes whose quantity is the lesser are connected to a contact plate according to the invention. N is in this case a natural number between 1 and about 15, with the maximum number of electrodes being limited by the electrode thickness. The contact plate is electrically insulated from the electrodes of the other polarity by a separator, when n electrodes of the one polarity are enclosed by n+1 electrodes of the other polarity. The above-mentioned separator is at the same time used as an electrolyte reservoir.

The electrodes according to the invention have a conductive base which is composed, for example, of a metal mesh, a metal foil, a metal grating, network, felt or foam, into which the respective electrode material is incorporated, for example using a pasting method or a pressing method.

The construction according to the invention of an electrode set which is intrinsically robust and easy to handle allows the quantity of positive and negative electrodes to be varied virtually as required, and the capacity of the cell and the physical side thus to be varied within wide limits. The use of a large number of thin electrodes makes it possible to construct an electrical rechargeable battery which can be loaded with high currents. The load capacity of the button cells according to the invention can be improved further by using n electrodes of the one polarity and n+1 electrodes of the other polarity.

Since the electrodes which are used can be stamped from strip electrodes, largely automated production is possible, with only low scrap rates. The electrode mass is preferably applied to the base material in the form of paste, using a squeegee technique.

The positive electrodes of rechargeable batteries according to the invention essentially have nickel hydroxide as the active mass, and the negative electrodes have. cadmium or a hydrogen-storing alloy as the active mass, or the positive electrodes contain a chalcogenide which has lithium ions, and the negative electrodes contain a compound which absorbs lithium, as the active material. In the case of a cell with positive nickel hydroxide and negative hydrogen storage alloy electrodes, potassium lye is used as the electrolyte, possibly with the addition of sodium hydroxide and lithium hydroxide.

Although this invention has been described with reference to specific forms of construction and methodology, it will be apparent to one of ordinary skill in the art that various equivalents maybe substituted, the sequence of steps maybe varied and certain steps may be used independently of others, all without departing from the spirit and scope of the invention defined in the appended claims.

What is claimed is:

1. A rechargeable battery having a case in the form of a gastight button cell comprising:

a case cup;

a case cover connected to said case cup via an electrically insulation seal and containing positive and negative electrodes with intermediate separators and an electrolyte;

wherein an electrode set formed from said electrodes and separators is arranged in the case;

wherein said electrode set contains at least two electrodes of one polarity which enclose an electrode of another polarity between them; and wherein said electrodes of each polarity are mechanically and electrically joined together at their edge portions at at least two locations on their respective circumferences.

2. The rechargeable battery as claimed in claim 1, wherein the electrodes have a conductive base selected from the group consisting of metal mesh, metal foil, metal grating, metal felt and metal foam.

3. The rechargeable battery as claimed in claim 1, wherein at least the electrodes of one polarity are connected to an electrically conductive contact plate.

4. The rechargeable battery as claimed in claim 1, wherein the electrode set comprises n electrodes of one polarity and n+1 electrodes of the other polarity, with the electrodes whose quantity is the lesser being connected to a contact plate.

5. The rechargeable battery as claimed in claim 1, wherein the positive electrodes contain nickel hydroxide as their active mass and the negative electrodes contain a hydrogen storage alloy or cadmium as their active material, or wherein the positive electrodes contain chalcogenide, containing lithium ions, as their active mass, and the negative electrodes contain a compound which absorbs lithium as the active material.

6. A method for producing a rechargeable battery comprising:

forming electrode strips and splitting said strips into electrode plates;

stacking positive and negative electrodes on top of one another with the interposition of separators;

mechanically and electrically joining together both the positive and negative electrodes to one another at an edge portion in at least two points on their respective circumferences;

impregnating the electrode packet produced therefrom with electrolyte;

inserting the impregnated electrode packet into a cell cover provided with a seal;

fitting a cell cup onto the impregnated electrode packet, cover and seal; and clinching the cell cup, impregnated electrode packet, cover and seal to form a gastight seal.

7. A rechargeable battery having a case in the form of a gastight button cell comprising:

a case cup;

a case cover connected to said case cup via an electrically insulating seal and containing positive and negative electrodes with intermediate separators and an electrolyte;

an electrode set formed from said electrodes and separators arranged in said case, cup, said electrode set containing at least two electrodes of one polarity which enclose an electrode of another polarity between them, said electrodes of each polarity being mechanically and electrically connected at at least two locations on their respective circumferences, and an electrically conductive contact plate connected to at least the electrodes of one polarity, said contact plate having connecting lugs extending therefrom, to which connecting tabs of said electrodes are electrically connected.

8. A rechargeable battery having a case in the form of a gastight button cell comprising:

a case cup;

a case cover connected to said case cup via an electrically insulation seal and containing positive and negative electrodes with intermediate separators and an electrolyte;

an electrode set formed from said electrodes and separators arranged in said case, cup, said electrode set containing at least two electrodes of one polarity which enclose an electrode of another polarity between them, said electrodes of each polarity being mechanically and electrically connected at at least two locations on their respective circumferences;

an electrically conductive contact plate connected to at least the electrodes of one polarity, said contact plate having openings extending therethrough to facilitate passage of said electrolyte and projections extending therefrom.

9. A rechargeable battery having a case in the form of a gastight button cell comprising:

a case cup;

a case cover connected to said case cup via an electrically insulation seal and containing positive and negative electrodes with intermediate separators and an electrolyte;

wherein an electrode set formed from said electrodes and separators is arranged in the case;

wherein said electrode set contains at least two electrodes of one polarity which enclose an electrode of another polarity between them;

wherein said electrodes of each polarity are mechanically and electrically joined together at their edge portions that overhang said electrodes at at least two locations on their respective circumferences;

wherein at least the electrodes of one polarity are connected to an electrically conductive contact plate; and wherein the seal is provided with retaining studs for connection to the projections of the contact plate.

10. A rechargeable battery having a case in the form of a gastight button cell comprising:

a case cup;

a case cover connected to said case cup via an electrically insulation seal and containing positive and negative electrodes with intermediate separators and an electrolyte;

wherein an electrode set formed from said electrodes and separators is arranged in the case;

wherein said electrode set contains at least two electrodes of one polarity which enclose an electrode of another polarity between them;

wherein said electrodes of each polarity are mechanically and electrically joined together at their edge portions that overhang said electrodes at at least two locations on their respective circumferences; and wherein separator leaves located between the electrodes are at least partially welded to one another at their edge portions which overhang the electrodes.

11. A rechargeable battery having a case in the form of a gastight button cell comprising:

a case cup;

a case cover connected to said case cup via an electrically insulation seal and containing positive and negative electrodes with intermediate separators and an electrolyte;

wherein an electrode set formed from said electrodes and separators is arranged in the case;

wherein said electrode set contains at least two electrodes of one polarity which enclose an electrode of another polarity between them; and wherein said electrodes of each polarity are mechanically and electrically joined together at their edge portions that overhang said electrodes at at least two locations on their respective circumferences.

* * * * *